United States Patent
Kornylo et al.

(10) Patent No.: US 7,798,518 B2
(45) Date of Patent: Sep. 21, 2010

(54) TRIM PANEL WITH PRE-WEAKENED SEGMENT AND BRIDGE

(75) Inventors: Walter P. Kornylo, Livonia, MI (US);
Jean-Nicolas Germain Montbrun, Farmington Hills, MI (US)

(73) Assignee: Magna International, Inc., Aurora (CA)

( * ) Notice: Subject to any disclaimer, the term of this patent is extended or adjusted under 35 U.S.C. 154(b) by 1057 days.

(21) Appl. No.: 11/412,635

(22) Filed: Apr. 27, 2006

(65) Prior Publication Data
US 2007/0252364 A1 Nov. 1, 2007

(51) Int. Cl.
*B60R 21/20* (2006.01)
(52) U.S. Cl. .................... 280/728.3; 280/728.2
(58) Field of Classification Search ........... 280/728.2, 280/728.3
See application file for complete search history.

(56) References Cited

U.S. PATENT DOCUMENTS

| | | | | |
|---|---|---|---|---|
| 6,716,519 | B2 * | 4/2004 | Ueno et al. | 428/308.4 |
| 7,014,209 | B2 * | 3/2006 | Muller et al. | 280/728.3 |
| 7,425,018 | B2 * | 9/2008 | Suwama et al. | 280/728.3 |
| 7,478,827 | B2 * | 1/2009 | Thomas et al. | 280/728.3 |
| 2003/0066586 | A1 * | 4/2003 | Blockhaus et al. | 156/78 |
| 2004/0164531 | A1 * | 8/2004 | Riha et al. | 280/732 |
| 2004/0173999 | A1 | 9/2004 | Thomas et al. | |
| 2004/0195814 | A1 * | 10/2004 | Muller et al. | 280/743.1 |
| 2005/0215143 | A1 | 9/2005 | Hehn et al. | |
| 2006/0267314 | A1 * | 11/2006 | Yasuda et al. | 280/728.3 |
| 2007/0029763 | A1 * | 2/2007 | Hayashi | 280/728.3 |

FOREIGN PATENT DOCUMENTS

| | | |
|---|---|---|
| DE | 29511172 | 2/1996 |
| DE | 10001246 | 7/2001 |
| DE | 10241930 | 3/2004 |
| EP | 0930202 | 7/1999 |
| EP | 1 588 906 | 10/2005 |

* cited by examiner

*Primary Examiner*—Toan C To
(74) *Attorney, Agent, or Firm*—Honigman Miller Schwartz and Cohn LLP

(57) ABSTRACT

A trim panel including a substrate layer having a first portion, a second portion, and a frangible pre-weakened segment between the first portion and the second portion; a bridge covering at least a portion of the pre-weakened segment frangibly connecting the first portion and second portion; and a skin layer covering at least a portion of the substrate layer and the bridge. A method of manufacturing a component of a trim panel is also disclosed.

32 Claims, 4 Drawing Sheets

TRIM PANEL WITH PRE-WEAKENED SEGMENT AND BRIDGE

FIELD OF THE DISCLOSURE

The disclosure generally relates to vehicular trim panels, including a trim panel having a pre-weakened segment and a bridge.

BACKGROUND

Interior trim panels, including those having a pre-weakened segment that corresponds to an "air bag door," are known in the art. From at least an aesthetic standpoint, however, it is often desirable to hide or obscure the pre-weakened segment from external visibility.

Conventional interior trim panels are not always successful in hiding or obscuring the location of the pre-weakened segments and a hidden air bag door. For example, a portion of an outer surface of the interior trim panel may creep into a pre-weakened segment of the panel when it is manufactured. As a result, the outer surface may include an undesirable tactile surface contour and/or visible interruption.

Among other possibilities, environmental changes may also have an adverse effect on a panel. For example, over time, the trim panel and surrounding components may witness temperature fluctuations; which over time, may cause the outer surface of the interior trim panel to become physically disrupted at or about a pre-weakened segment.

Accordingly, a desire exits for improved trim panels that improve the hidden or obscured nature of the panel associated with pre-weakened segments.

DESCRIPTION OF THE DRAWINGS

The present disclosure will now be described, by way of example, with reference to the accompanying drawings, in which.

DETAILED DESCRIPTION

Figure 1A:
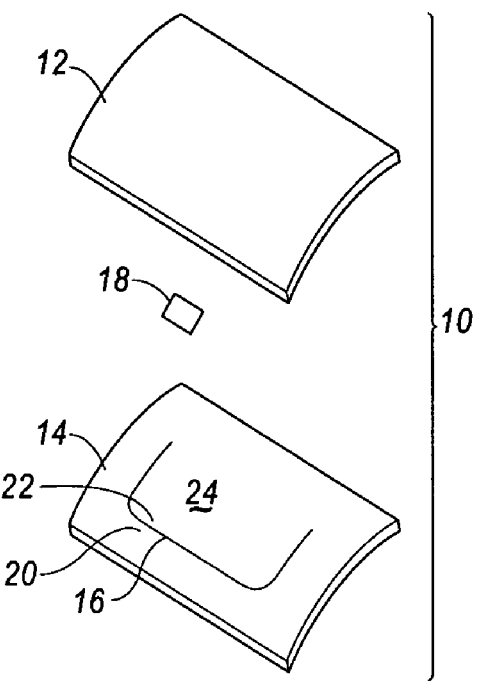
FIGS. 1A-1D illustrate exploded views of trim panels according to embodiments of the invention.

Trim panels in accordance with various embodiments of the invention are shown in FIGS. 1A through 2D, the trim panels being generally identified as 10, 100, 200, and 300. The illustrated trim panels 10, 100, 200, 300 include a skin layer 12, 102, 202, 302; a substrate layer 14, 104, 204, 304 having a pre-weakened segment 16, 106, 206, 306; and one or more bridges 18, 108a-108d, 208, 308.

Figure 1B:
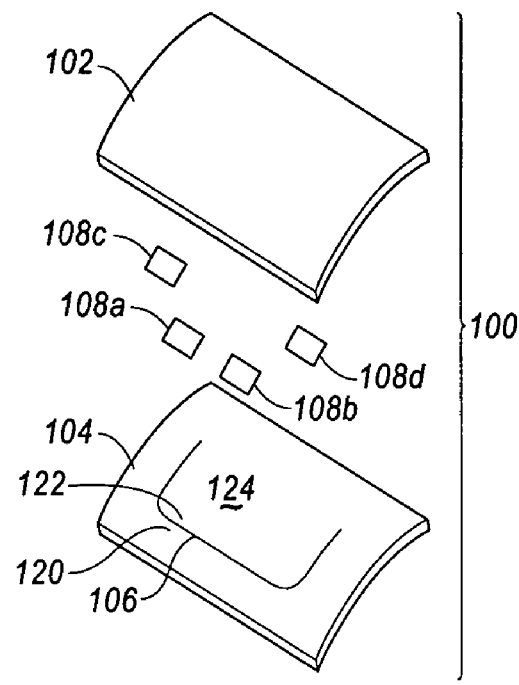
Figure 1C:
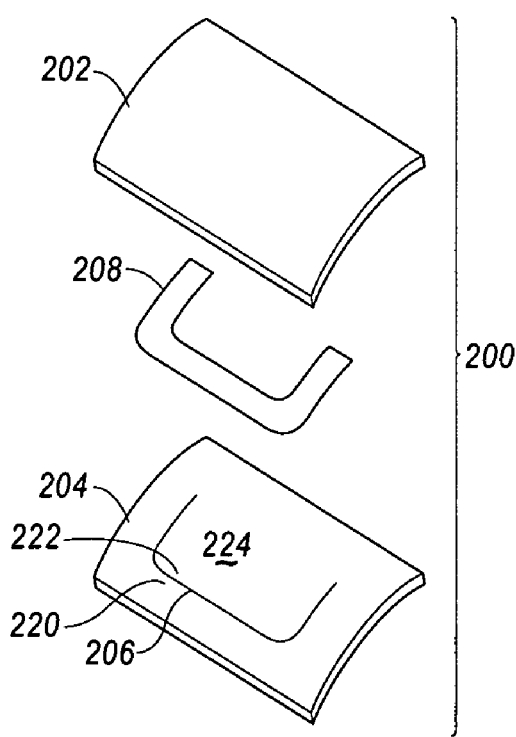
Figure 1D:
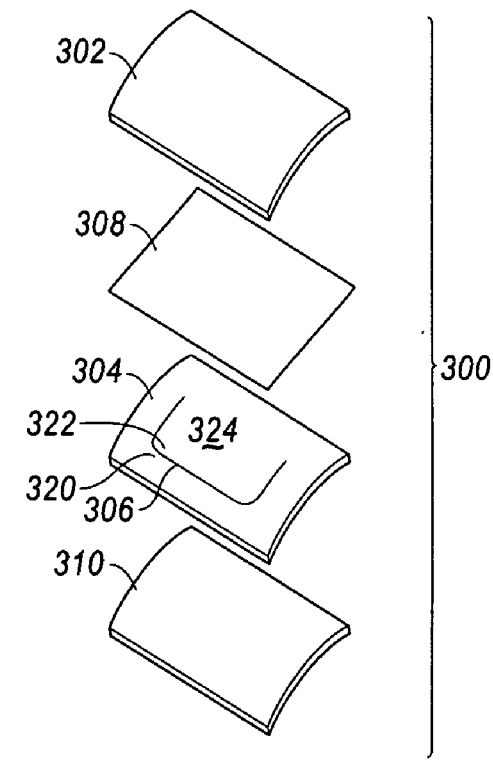
Figure 2A:
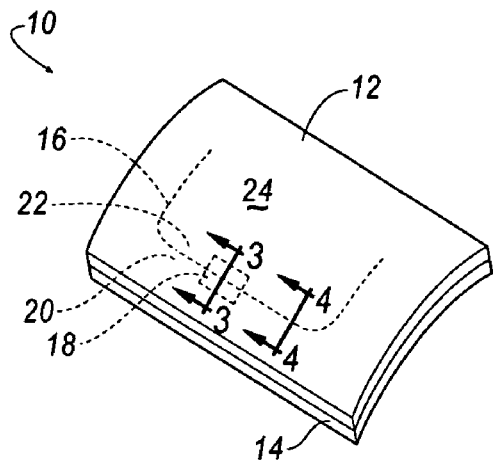
FIGS. 2A-D illustrate perspective views of the trim panels associated with FIGS. 1A-1D, respectively.
Figure 2B:
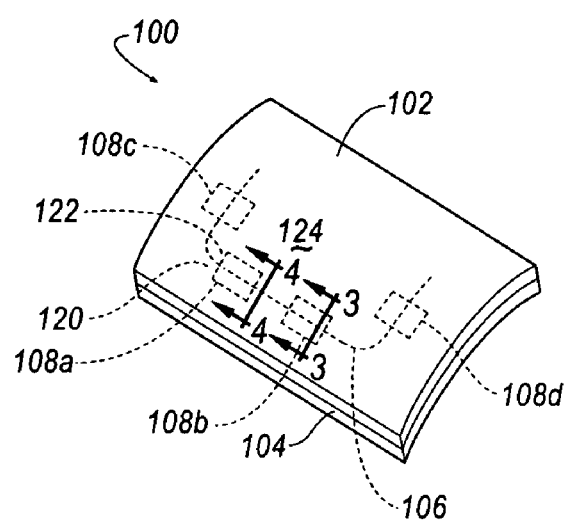
Figure 2C:
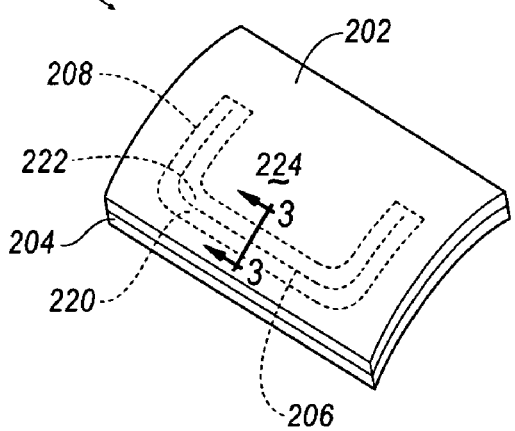
Figure 2D:
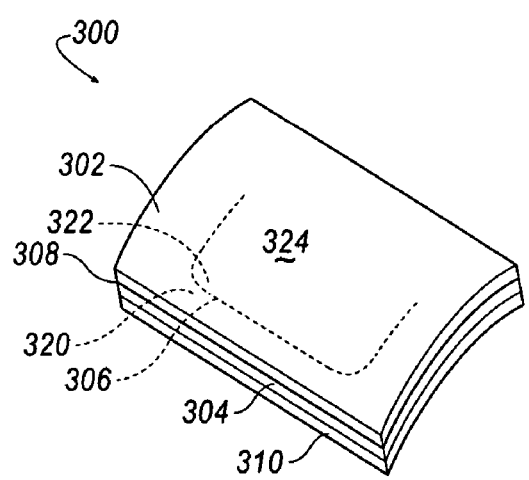

If desired, the trim panel 10, 100, 200, 300 may also include one or more additional layers, such as, for example, a second substrate layer, which is shown generally at 310 in FIGS. 1D and 2D. The second substrate layer 310 may, for example, comprise an optional rigid substrate that provides support for skin layer 302 and first substrate layer 304. In an embodiment, the second substrate layer 310 may include a door consistent with one or more of the pre-weakened segment 16, 106, 206, 306 to define an air bag opening. The foregoing pre-weakened segment may be operatively arranged about the door such that upon deployment of an associated airbag, the airbag can effectively deployed through an area defined by or associated with the pre-weakened segment of the panel.

The skin layer 12, 102, 202, 302 may include, for example, an external surface, such as, for example, an external surface or skin comprised of leather, artificial leather, vinyl, a thermoplastic elastomer, or the like. While particular skin materials are described, upon considering the disclosure one of ordinary skill in the art will readily recognize a broad range of possibilities and the invention should not be limited to the foregoing examples. As illustrated in FIGS. 2A-2D, the substrate layer 14, 104, 204, 304 may be adjacent an inside or "B-surface" of the skin layer 12, 102, 202, 302.

The substrate layer 14, 104, 204, 304 may include, for example, any desirable material that functions in the intended environment, including, without limitation, a soft, cushioning foam, such as, for example, polyurethane (PU), polyethylene (PE), or the like. If included, the second substrate layer 310 may, for example, be located on a surface of the first substrate layer 304 opposite that of the skin layer 302, as illustrated in FIG. 2D.

According to an embodiment, the substrate layer 14, 104, 204, 304 may be arranged as, for example, a padding layer that includes a three-dimensional PE woven mesh. Such a substrate layer can have a relatively high shear strength, for example, 600 N (135 lbs-force) or more.

Figure 5:
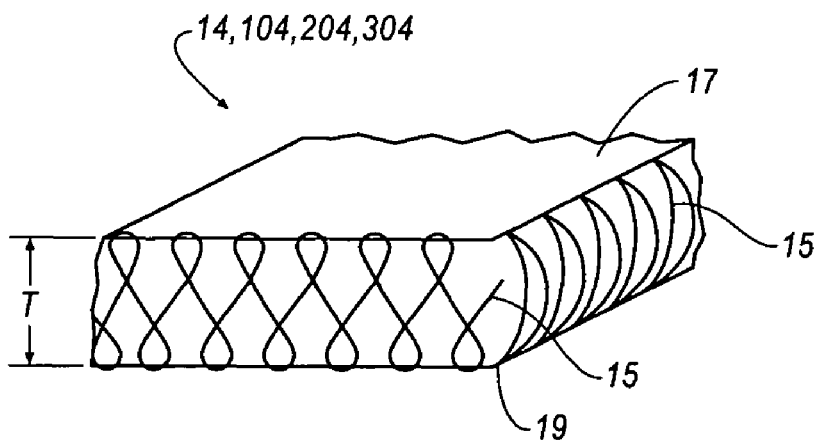
FIG. 5 is a perspective, cross-sectional view of a portion of a substrate layer of a trim panel according to an embodiment of the invention.

The substrate layer 14, 104, 204, 304 illustrated in FIG. 5 is shown having a thickness T. In an embodiment, thickness T of the substrate layer 14, 104, 204, 304 is about 0.11032 inches (2.8 mm)±1 mm. Further, if desired, substrate layer 14, 104, 204, 304 may comprise a pole yarn 15 meshed with a top layer 17 and a bottom layer 19. Among other things, substrate layer 14, 104, 204, 304 can provide a soft cushioning effect, improved and extremely high air distribution in all directions (whether under an applied pressure or no applied pressure), improved or enhanced recovery, a relatively high degree of shock absorption, and improved or superior lamination qualities compared to certain conventional panels.

According to an embodiment, a pre-weakened segment 16, 106, 206, 306 is formed in the substrate layer 14, 104, 204, 304. The pre-weakened segment 16, 106, 206, 306, which may be formed using various techniques known in the art, may comprise, for example, a continuous interruption (e.g. a continuous line that is laser etched, laser scored, mechanically scored, or the like), or, one or more series of interruptions (e.g. a plurality of line segments arranged in a line, such as a series of laser etches, laser scores, mechanical scores, perforations, or the like). As such, one of skill in the art will appreciate that the pre-weakened segment 16, 106, 206, 306 may include any desirable number of line segment(s) and/or pattern(s). As desired for a given application, a pre-weakened segment 16, 106, 206, 306 can partially or fully extend through the thickness T of the substrate layer 14, 104, 204, 304. Moreover, the pre-weakened segment 16, 106, 206, 306 may include or take on any desirable pattern, such as, for example, a U-shape pattern, an X-shape pattern, an H-shape pattern, or the like. For brevity, the techniques used to pre-weaken the substrate layer 14, 104, 204, 304 will not be discussed herein as they will be recognized by one of ordinary skill in the art; thus, the invention should not be limited to a particular type of pre-weakening.

As shown in illustrated embodiments in FIGS. 1A-2D, the pre-weakened segment 16, 106, 206, 306 may take, for example, the form of a generally U-shaped pattern. According to an embodiment of the invention, the pre-weakened segment 16, 106, 206, 306 can generally interrupt the substrate layer 14, 104, 204, 304 in a manner to separate or partition the substrate layer 14, 104, 204, 304 into at least a first portion 20, 120, 220, 320 and a second portion 22, 122, 222, 322, which may or may not be completely segregated from the first portion. In an embodiment, the second portion 22, 122, 222, 322 generally defines an a partial or complete outline of an air bag door. However, while a U-shape is shown and described, the invention is not so limited and may instead take various other forms as will be appreciated by those of skill in the art.

Figure 4:
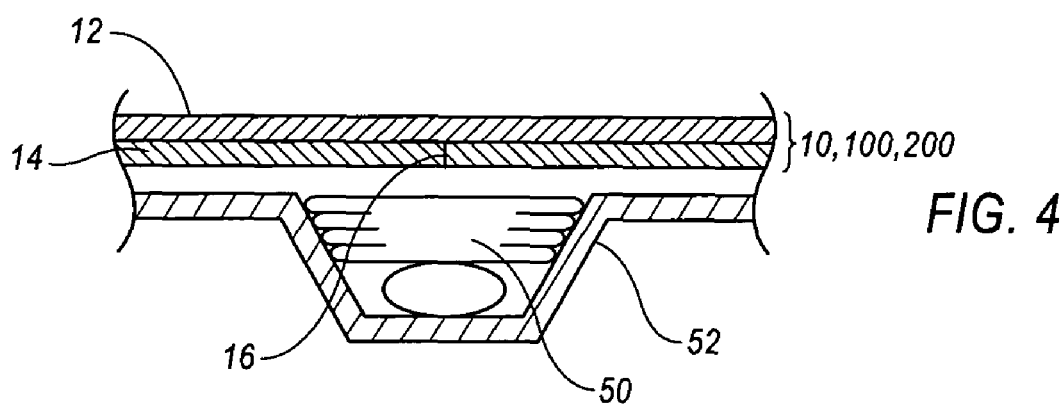
FIG. 4 is a cross-sectional view of a trim panel of the type shown in FIGS. 2A and 2B taken along line 4-4.

With reference to FIGS. 1A and 2A, a length of the pre-weakened segment 16 is shown generally defining a flap 24 or the like to allow an air bag to pass through. A bridge 18 is shown extending over and covering a portion of the first portion 20, a portion of pre-weakened segment 16, and a portion of the second portion 22. As shown and further illustrated in connection with the positional cross-section view of FIG. 4, the bridge 18 illustrated in connection with FIG. 2A does not extend along the entire length of the pre-weakened segment 16.

FIGS. 1B and 2B illustrate an embodiment of the invention that includes a plurality of bridges, generally illustrated as bridges 108a-108d. As shown in FIG. 2B, each bridge 108a-108d extends over and covers a portion of first portion 120, a portion of the pre-weakened segment 106, and a portion of second portion 122. However, the invention is not limited to the number, size, and configuration shown.

FIGS. 1C and 2C illustrate an embodiment of the invention in which a single bridge 208 is configured to cover the entire pre-weakened segment 206. As generally shown, the bridge 208 may be shaped to generally or substantially correspond to the shape of the pre-weakened segment that it is covering. In the illustrated embodiment, the pre-weakened segment 206 has a generally U-shaped configuration. However, as previously noted, the invention is not so limited and the segment 206 (and, if desired, the corresponding or associated bridge 208) may instead take numerous other configurations, including those previously mentioned, such as an X-shape, an H-shape, or various other configurations, including, without limitation, those known in the art.

Moreover, in another embodiment, such as generally illustrated in connection with FIGS. 1D and 2D, a bridge 308 may be configured to extend over larger portions of the substrate layer 304, up to and including the entire area generally associated with the surface of substrate layer 304. With such embodiments, a bridge 308 can consequently be used to extend over and cover essentially all or substantially all of a given pre-weakened segment 306, or a plurality of pre-weakened segments, formed in a substrate layer 304. Further, it should be appreciated that, if desired, one or more such bridges 18, 108a-108d, 208, 308 of uniform or varied sizes and shapes can be used to cover all or portions of at least one substrate layer 14, 104, 204, 304 and/or pre-weakened segment 16, 106, 206, 306.

If desired, the bridge (or bridges) may be comprised of a fusible material, such as, for example, a polyamide fusible web material. In an embodiment, the fusible adhesive may include a spun-bond, micro-porous material having a relatively low tear-strength and a relatively low shear strength.

For example, the fusible adhesive may comprise a thermo-responsive adhesive and the shear strength of one or more bridges 18, 108a-108d, 208, 308 may be approximately equal to, for example, 1N to 2N (0.22 lbs-force to 0.45 lbs-force) and the thickness of one or more bridges 18, 108a-108d, 208, 308 may be approximately equal to, for example, 1 mil to 2 mil (0.001 inches to 0.002 inches). In addition to the foregoing, the panel includes a separate adhesive, for example, a spray adhesive or the like for attaching the skin layer 12.

Figure 6:
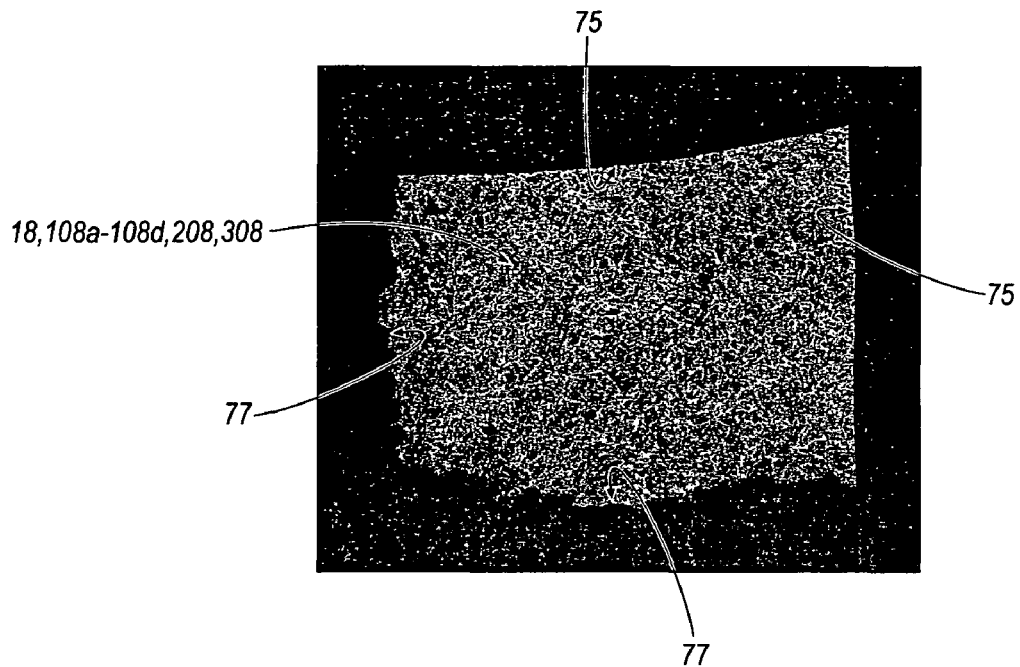
FIG. 6 is a top view of a bridge according to an embodiment of the invention.

According to an embodiment, one or more bridges 18, 108a-108d, 208, 308 may be comprised of a polyamide fusible web material. A sample of an exemplary bridge 18, 108a-108d, 208, 308 is generally illustrated in FIG. 6. The illustrated bridge has been frangibly sheared to illustrate natural rough, uneven edges 77 that can arise from the microporous, spun-bond nature of a bridge material. However, the bridge may be provided in the form of a sheet and may be sized or configured as desired and, as depicted, may also include generally straight, even edges 75, as well as the more naturally rough, uneven edges 77.

Figure 3:
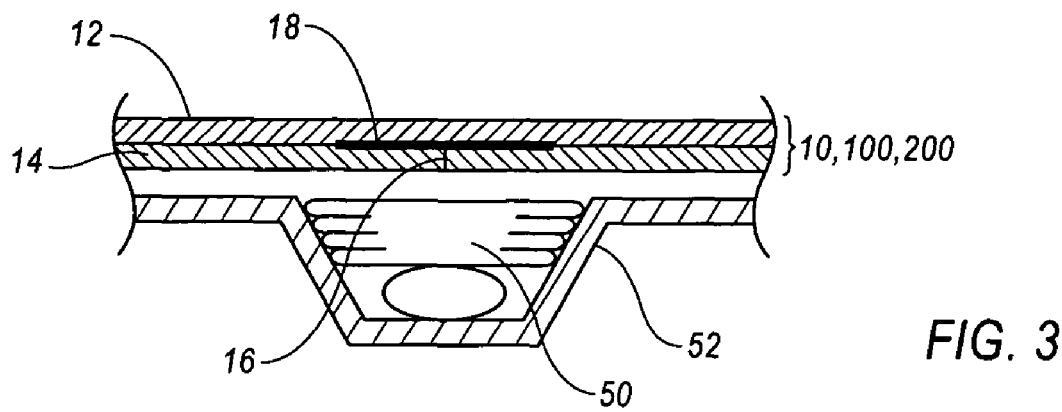
FIG. 3 is a cross-sectional view of a trim panel of the type shown in FIGS. 2A-2C taken along line 3-3.

The bridges 18, 108a-108d, 208, 308 may cover and mask pre-weakened segment(s), and they may also serve to frangibly connect portions of the substrate layer 14, 104, 204, 304 adjacent to the covered portion of the pre-weakened segment 16, 106, 206, 306. In an embodiment, bridges 18, 108a-108d, 208, 308 frangibly connect portion of the substrate layer 14, 104, 204, 304 adjacent to the covered portion of the pre-weakened segment 16, 106, 206, 306 by fusing them. While one or more bridges 18, 108a-108d, 208, 308 may serve to, at least, to reinforce the structural integrity of the pre-weakened area of the substrate layer 14, 104, 204, 304 at least proximate the pre-weakened segment 16, 106, 206, 306, the bridge may also serve to permit a first portion 20, 120, 220, 320 to be selectively and controllably separated from a second portion 22, 122, 222, 322 when, for example, an inflatable restraint 50 (see FIGS. 3 and 4) is deployed from a chute/housing 52.

By including one or more bridges to cover one or more pre-weakened segments of a substrate layer, an exterior visible "show surface" ("A-surface") of a skin layer 12, 102, 202, 302, such as shown generally at 24, 124, 224, 324 in FIGS. 2A-2D, can provide an exterior surface that is substantially, if not entirely, devoid of interruptions caused by the interaction or interconnection of the skin layer and the pre-weakened segments of the substrate layer. That is, with the selective incorporation of one or more bridges, an outline associated with a pre-weakened segment of a substrate layer can be covered and obscured by the one or more bridges and the exterior visible "show surface" can appear to have a more consistent and less interrupted visual or tactile appearance. As such, in the context of a trim panel for an air bag application, the inclusion of one or more bridges in a trim panel in accordance with embodiments of the invention can serve to eliminate or materially reduce the undesirable visible or tactile revelation of, for instance, the location of a hidden air bag door formed in the panel and can help prevent the outlining of the same, whether at the time of manufacturing or, at a later time after being exposed to a varying environmental conditions.

Figure 7:
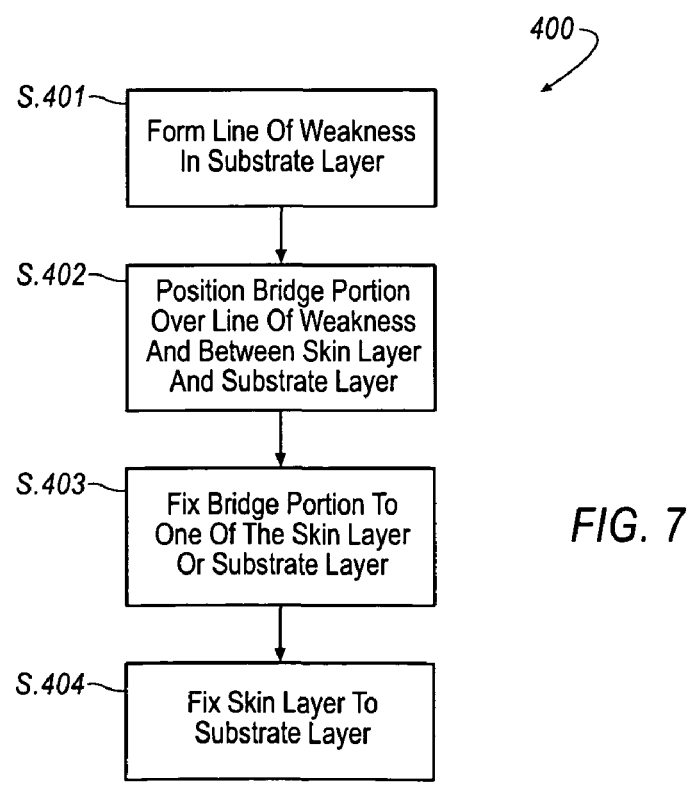
FIG. 7 generally illustrates a method for manufacturing an interior trim panel according to an embodiment of the invention.

Referring to FIG. 7, a method for making a trim panel according to an embodiment of the invention is generally depicted at 400. At S.401, a substrate layer is provided. In connection with S.402, one or more pre-weakened segments are formed in the substrate layer. As noted in connection with S.403, at least one bridge is provided to cover at least a portion of the length of the pre-weakened segment. At S.404, at least a portion of the substrate and at least a portion of a bridge is covered by a skin layer with the addition of an adhesive.

According to an embodiment, a bridge may be comprised of a fusible material and may be fused to the substrate layer by applying direct or indirect heat to all or one or more portions of the associated bridge or bridges (as the case may be). Alternatively, or in addition to the foregoing, a bridge may be connected to the substrate layer in other manners, for example, using conventional adhesives and methodologies. It should be noted that while the foregoing processes discuss the use of heat, the invention is not so limited, and the layers may be connected or otherwise attached using various known methods.

Again, at S.404, in an embodiment, at least a portion of the substrate and at least a portion of a bridge are covered by a skin layer using an adhesive. In an embodiment, the foregoing adhesive is separate or secondary to the adhesive that may be used to attach the bridge to the substrate. In an embodiment, a pre-formed skin layer can be used to cover the substrate layer. Further, the substrate layer may include one or more bridges that can be connected to the substrate layer, whether by employing heat, adhesives, or a combination of heat and adhesives, prior to the covering of the substrate layer by the skin layer.

For example, a bridge/substrate layer combination may be fixed to the skin layer with an adhesive, or, by casting, extruding, melting, spraying, or otherwise forming the skin layer on the bridge/substrate combination.

According to yet another embodiment, a skin layer may be cast, extruded, melted, sprayed, or otherwise formed on the substrate layer, the substrate layer including a one or more bridges fused (or fusible) thereto.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A trim panel, comprising:
    a substrate layer having a first portion, a second portion, and a frangible pre-weakened segment between the first portion and the second portion;
    a bridge aligned with and covering at least a portion of the pre-weakened segment to frangibly connect the first portion and the second portion; and
    a skin layer covering at least a portion of the substrate layer and the bridge and attached to at least one of the substrate layer and the bridge by an adhesive, wherein the skin layer is completely void of weakened regions and recesses such that placement of the skin layer relative the frangible pre-weakened segment of the substrate layer is arbitrary.

2. The trim panel according to claim 1, wherein the bridge is fused to the first portion and the second portion.

3. The trim panel according to claim 1, wherein the bridge includes a fusible adhesive.

4. The trim panel according to claim 3, wherein the fusible adhesive includes a microporous and spun-bond having a low tear-strength and a low shear strength.

5. The trim panel according to claim 1, wherein the bridge includes a fusible adhesive film patch that generally extends over at least a portion of a length of the pre-weakened segment.

6. The trim panel according to claim 1, wherein the substrate layer comprises a pole yarn meshed with a top layer and a bottom layer.

7. The trim panel according to claim 1, wherein the skin layer includes leather or a form of artificial leather.

8. The trim panel according to claim 1, wherein the bridge is frangible and has a thickness that is less than 0.10 the thickness of the first or second portions of the substrate.

9. The trim panel according to claim 1, wherein the bridge comprises a polyimide fusible web material.

10. The trim panel according to claim 1, wherein the bridge has a thickness of about 0.001 to about 0.002 inches.

11. The trim panel according to claim 1, wherein the thickness of the first and second portions of the substrate is at least fifty times greater than the thickness of the bridge.

12. The trim panel according to claim 1, wherein the bridge masks the pre-weakened segment from visibility.

13. The trim panel according to claim 1, wherein the skin layer covers the bridge and the pre-weakened segment such that the surface of the skin positioned above the pre-weakened segment has a substantially uninterrupted external appearance.

14. The trim panel according to claim 1, wherein the pre-weakened segment at least partially defines an air bag flap coincident with an air bag opening.

15. The trim panel according to claim 1, wherein the trim panel includes a plurality of bridges.

16. The trim panel according to claim 1, wherein one or more bridges completely cover the pre-weakened segments of the trim panel.

17. The trim panel according to claim 1, wherein the shape of the bridge generally corresponds to the shape of at least a portion of the pre-weakened segment.

18. The trim panel according to claim 1, wherein the pre-weakened segment includes a segment having a U-shape, an X-shape, or an H-shape.

19. The trim panel according to claim 1, wherein the substrate layer is comprised of polyethylene.

20. The trim panel according to claim 1, wherein the bridge is includes
    a thermoresponsive adhesive material that provides
        means for bonding the bridge to one of the substrate layer and the skin layer upon an application of heat to the bridge.

21. The trim panel according to claim 20, wherein the bridge is thermoresponsively bonded to the substrate layer, wherein the adhesive attaches the skin layer to one or more of the bridge and substrate layer.

22. The trim panel according to claim 20, wherein the bridge is thermoresponsively bonded to the skin layer, wherein the adhesive attaches the substrate layer to one or more of the bridge and skin layer.

23. A component of a trim panel, comprising:
    a substrate layer having a first portion, a second portion, and a pre-weakened segment between the first portion and the second portion; and
    a bridge covering at least a portion of the pre-weakened segment and frangibly connecting the first portion and second portion,
    wherein the bridge comprises a polyamide fusible web material that masks the pre-weakened segment,
    and wherein the bridge is fusibly attached to the first portion and the second portion.

24. The component according to claim 23, including a skin layer that covers at least a portion of the substrate layer and the bridge, wherein the skin layer is attached to at least a portion of the substrate layer and the bridge by a secondary adhesive.

25. The trim panel according to claim 23, wherein the pre-weakened segment at least partially defines an air bag flap.

26. A trim panel, comprising:
a substrate layer having a first portion, a second portion, and a frangible pre-weakened segment between the first portion and the second portion;
a thermoresponsive bridge aligned with and covering at least a portion of the pre-weakened segment to frangibly connect the first portion and the second portion; and
a skin layer covering at least a portion of the substrate layer and the thermoresponsive bridge and attached to at least one of the substrate layer and the thermoresponsive bridge.

27. The trim panel according to claim 26, wherein the thermoresponsive bridge includes an adhesive material provides
means for bonding the thermoresponsive bridge to one of the substrate layer and the skin layer upon an application of heat to the adhesive material.

28. The trim panel according to claim 27, wherein the thermoresponsive bridge is thermoresponsively bonded to the substrate layer, wherein a secondary adhesive attaches the skin layer to one or more of the thermoresponsive bridge and substrate layer.

29. The trim panel according to claim 27, wherein the thermoresponsive bridge is thermoresponsively bonded to the skin layer, wherein a secondary adhesive attaches the substrate layer to one or more of the thermoresponsive bridge and skin layer.

30. The trim panel according to claim 26, wherein the skin layer is completely void of weakened regions and recesses such that placement of the skin layer relative the frangible pre-weakened segment of the substrate layer is arbitrary.

31. The trim panel according to claim 26, wherein the thermoresponsive bridge includes a micro-porous and spun-bond material having a low tear-strength and a low shear strength.

32. The trim panel according to claim 26, wherein the thermoresponsive bridge comprises a polyamide fusible web material.

* * * * *